United States Patent [19]

Finkle

[11] 3,715,138
[45] Feb. 6, 1973

[54] RESILIENT FRANGIBLE BUMPER GUARD

[76] Inventor: Milton Finkle, 2724 Vandiver Street, West Palm Beach, Fla.

[22] Filed: Jan. 22, 1971

[21] Appl. No.: 108,833

[52] U.S. Cl. ..........................293/1, 52/716, 293/65, 293/71 P
[51] Int. Cl. .......B60r 19/08, B61f 19/04, E04f 19/00
[58] Field of Search .......49/462; 161/30; 293/48, 65, 293/71 R, 1, 71 P; 52/716

[56] References Cited

UNITED STATES PATENTS

| | | | |
|---|---|---|---|
| 2,873,993 | 2/1959 | Sarke | 293/71 R X |
| 3,572,798 | 3/1971 | Kunericius | 293/71 R X |
| 3,110,516 | 11/1963 | Sukala, Jr. | 293/71 R X |
| 2,226,615 | 12/1940 | Killen | 49/462 |
| 3,081,119 | 3/1963 | Dison | 293/48 |
| 3,147,176 | 9/1964 | Haslam | 161/39 |

Primary Examiner—Gerald M. Forlenza
Assistant Examiner—Howard Beltran
Attorney—Barry L. Haley

[57] ABSTRACT

A resilient, flexible breakaway bumper guard for break-away attachment to a vehicle bumper. The resilient guard is mounted on the bumper with an adhesive that allows for the breaking away of the guard upon a sizable collision, thus reducing or eliminating damage to the bumper. The adhesive may also hold air in a trapped space between the bumper and the resilient member providing additional resiliency prior to break-away.

7 Claims, 7 Drawing Figures

PATENTED FEB 6 1973

3,715,138

MILTON FINKLE
INVENTOR.

BY Barry L. Haley
ATTORNEY

RESILIENT FRANGIBLE BUMPER GUARD

BACKGROUND OF THE INVENTION

This invention relates generally to attachable and detachable resilient guards for use as protective devices for vehicle bumpers such as an automobile bumper. Increased automobile traffic has created a large increase in minor and major vehicle collisions. Automobiles have long used all-metal bumpers which scratch and dent upon a minor collision and bend and break-up in a major collision. Recently, vehicles have been made having bumpers with hard rubber guards rigidly coupled to the metal bumper. Because of this rigid attachment, damage may still be sustained by the bumper even from minor impacts. Also non-resilient vehicle section impacts increase passenger injury. Applicants' now bumper guard separates from the bumper before damage is sustained by the bumper during minor impacts. The guard is also easily mounted to any automobile bumper regardless of the vehicles' age.

BRIEF DESCRIPTION OF THE INVENTION

A resilient, flexible guard for vehicle bumpers to reduce collision impact and to protect against bumper damage comprising a resilient, flexible guard member having one side shaped for adhesive coupling with said bumper, bumper-guard member adhesive applied to said guard member on the bumper coupling side being flexibly shaped to fit to the contour of said bumper. The coupling side may also have a flexible cavity providing an airspace that is sealed when the guard is attached to the bumper. The closed airspace acts as a pneumatic shock absorbing resevoir. The guard is generally rectangularly shaped with longest side being parallel to the bumper length. The adhesive is such as to provide a strong bond between the resilient surface of the guard member and the metal bumper surface. A plurality of guards may be used on each surface.

It is an object of this invention to provide an improved vehicle bumper guard.

It is another object of this invention to provide a break-away bumper guard.

It is still yet another object of this invention to provide an universally mountable bumper guard capable of fitting various shaped vehicle bumpers.

In accordance with these and other objects which will be apparent hereinafter, the instant invention will now be described with particular reference to the accompanying drawings.

PREFERRED EMBODIMENT OF THE INVENTION

Figure 1A:
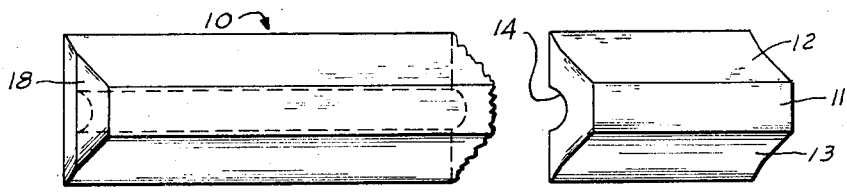
FIG. 1A shows a front perspective view of Applicants' invention.
Figure 1B:
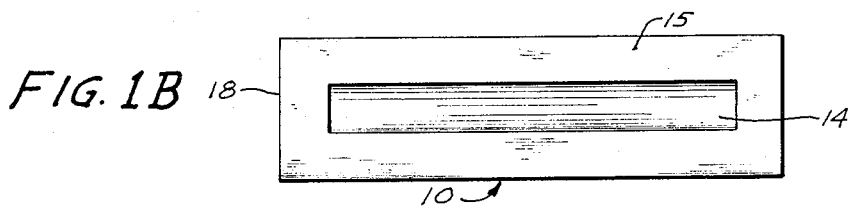
FIG. 1B shows the back, attaching side of Applicants' invention.

Referring now to the drawings and in particular to FIG. 1A, applicants' resilient bumper guard 10 is shown in cutaway cross-section. The overall shape of the guard 10 is an elongated trapeziodal prism having a leading or contacting surface 11 with adjacent surfaces 12 and 13 which taper to the bottom of attaching surface 15. The attaching surface 15 (FIG. 1B) has an elongated, half-cylindrically shaped grooved portion 14 parallel to the length of the guard 10 which is closed at each end 18. Grooved portion 14 provides a sealed air space after the guard 10 is placed on a vehicle bumper. The attaching surface 15 is suitable for receiving an adhesive and is flexible to adapt to various shaped vehicle bumper surfaces. The end surfaces 18 are also tapered down from surface 11 to the bottom enclosing grooved portion 14.

Figure 2A:
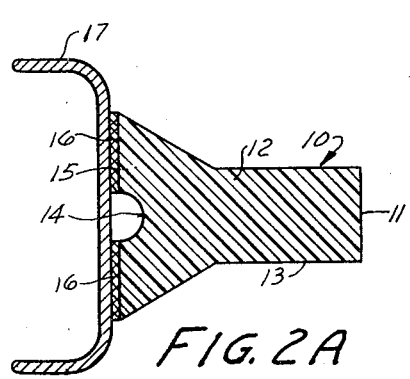
FIGS. 2A and 2B are vertical cross-sections of applicants' inventions mounted on vehicle bumpers.

FIG. 2A shown bumper guard 10 attached by adhesive material 16 to a vehicle bumper 17 along attaching surface 15. Contacting surface 11 is facing the direction of impact while surfaces 12 and 13 are slightly tapered back toward the bottom 15. The guard 10 is attached to front (generally flat) portion of bumper 17.

Figure 2B:
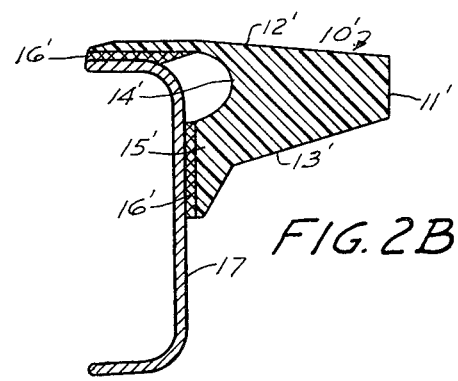

FIG. 2B shows an alternate embodiment of the bumper guard 10' in which the attaching surface 15' is contoured about the top portion of bumper 17 for adaptibility to different shaped bumpers. The base portion of guard 10' is narrower and the sides 12' and 13' are more tapered to provide for a more flexible movement of surface 15'. Again the guard 10' is attached to the bumper 17 by adhesive 16'.

Figure 3B:
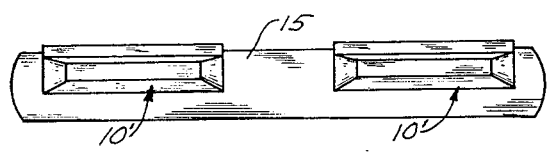
FIGS. 3A and 3B are front perspective views of Applicants' invention mounted on vehicle bumpers.
Figure 3A:
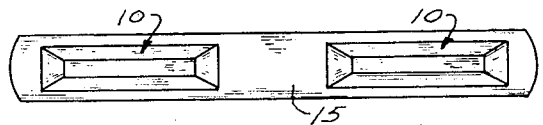

FIG. 3A shows one embodiment with a pair of guard 10 mounted on the bumper 15. The elongated guards 10 are placed in line and cover a substantial portion of the bumper 15 surface area.

FIG. 3B shows the installment of the alternate embodiment guard 10' of FIG. 2B mounted at the top of bumper 15. This mounting will aid in the break-away feature by allowing the guards 10' to slide over the top upon receiving a sufficient impact force. However the exact positioning of the guard 10 or 10' along the bumper length is not deemed critical to the overall operation of the invention.

Figure 4:
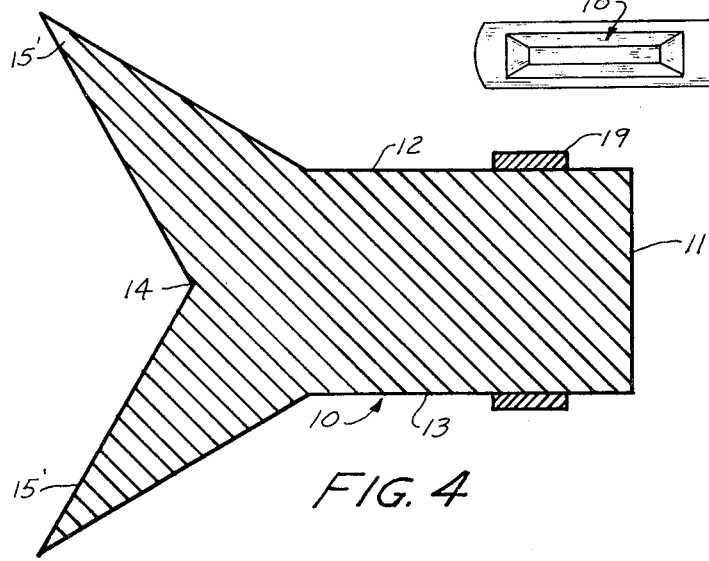
FIG. 4 is a vertical cross-section of an alternate embodiment of Applicants' invention.

FIG. 4 shows an alternate embodiment of the invention with highly tapered bottom and side portions leading to attaching surfaces 15'. Also a structural bar 18 surrounds the main body portion. Structural bar 18 may be a metal bar circumferentially extending in the longitudinal direction of the guard 10. The exterior surface of structural bar 18 is preferably chrome-plated for aesthetic purposes, but the primary purpose of the bar 18 is to structurally improve the impact strength by providing a rigid encompassing ring that partially contains the flexible member upon impact. Tapered bottom sections 15' are narrow to allow flexible adaptation to a bumper surface. An air space with its top at 14 will be formed when the guard is coupled to a bumper.

In operation the guard is positioned adjacent the exterior bumper surface and adhesive is applied to the attaching surface of the guard. Also the adhesive could be pre-applied to the surface with a paper type cover to be removed when the guard is to be attached. The guard is then firmly pressed against the bumper surface and the adhesive allowed to dry. The adhesive may be any type of industrial adhesive that binds metal or fiber glass to hard rubber. The adhesive bond is strong enough to hold the guard on the bumper during a light impact or when pushing other vehicles. For vehicle collisions that would normally dent the bumper without causing other damage, the guard will absorb the impact shock while breaking away from the bumper surface; therefore, the bumper will not be dented or damaged. For a high speed collision, the guard will absorb the initial impact shock and reduce damage to the vehicle but not prevent it. Because of the ease and simplicity of attachment, any vehicle bumper may be protected. The guard is preferably composed of a hard rubber, but other resilient materials are possible.

Also the impact surfaces and tapered sides of the guard may be covered with reflective paint for increased vehicle safety. The shape of the cavity providing the pneumatic reservoir between the bumper and the guard may be varied in the different embodiments to establish the volume of air desired for a particular sized guard.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A break-away vehicle bumper guard comprising:
a resilient, impact absorbing member having an attaching surface and an impact surface; and
adhesive material covering said attaching surface adapted to adhere to a vehicular bumper surface at a strength to allow the breaking away of the resilient member upon a predetermined collision impact on said resilient member, said resilient member attaching surface having a cavity portion adjacent said adhesive covered portion whereby the cavity provides a sealed, enclosed air space whenever said guard is adhesively coupled to said vehicle bumper.

2. A bumper guard as in claim 1, wherein:
said attaching surface of said resilient member is tapered about its outside perimeter for increased flexibility of said attaching surface.

3. A bumper guard as in claim 2, wherein:
said resilient member is tapered from a larger area at the attaching surface to a smaller area at said impact surface.

4. A bumper guard as in claim 3 including:
a structure bar coupled to an circumferentially disposed longitudinally about the perimeter of said resilient member.

5. A bumper guard as in claim 4, wherein:
said resilient member is elongated in a first direction parallel to the longitudinal direction of said bumper and said resilient member body portion being trapezoidally shaped in a plane perpendicular to said elongated direction.

6. A bumper guard as in claim 5, wherein:
said attaching surface includes tapered, narrow edge portions adapted to flexibly conform to the shaped of an adjacent adhered surface, and adapted to be coupled to a curved portion of said adjacent surface.

7. A bumper guard as in claim 4, in combination with a vehicle bumper, wherein:
the resilient member attaching surface surrounds said cavity, forming an enclosed, sealed chamber when said resilient member attaching surface engages said vehicle bumper surface.

* * * * *